US 008146811B2

(12) United States Patent
Kundu et al.

(10) Patent No.: US 8,146,811 B2
(45) Date of Patent: Apr. 3, 2012

(54) CART INSPECTION FOR SUSPICIOUS ITEMS

(75) Inventors: Malay Kundu, Lexington, MA (US); Brian Frank O'Donnell, Nashua, NH (US); Matthew K. Farrow, Canton, MA (US); Vikram Srinivasan, Billerica, MA (US); Joshua Migdal, Wayland, MA (US)

(73) Assignee: Stoplift, Inc., Cambridge, MA (US)

( * ) Notice: Subject to any disclaimer, the term of this patent is extended or adjusted under 35 U.S.C. 154(b) by 1057 days.

(21) Appl. No.: 12/047,042

(22) Filed: Mar. 12, 2008

(65) Prior Publication Data

US 2008/0226129 A1  Sep. 18, 2008

Related U.S. Application Data

(60) Provisional application No. 60/906,692, filed on Mar. 12, 2007.

(51) Int. Cl.
*G06K 15/00* (2006.01)
*G06K 9/00* (2006.01)
(52) U.S. Cl. ........ 235/383; 235/375; 235/381; 382/103; 382/209
(58) Field of Classification Search .................. 381/103, 381/209, 218; 235/383, 375, 381, 454; 382/103, 382/209, 218
See application file for complete search history.

(56) References Cited

U.S. PATENT DOCUMENTS

| 5,745,036 | A | 4/1998 | Clare |
| 5,965,861 | A | 10/1999 | Addy et al. |
| 7,049,965 | B2 | 5/2006 | Kelliher et al. |
| 7,080,778 | B1 | 7/2006 | Kressin et al. |
| 7,100,824 | B2 * | 9/2006 | Ostrowski et al. ............ 235/383 |
| 7,118,026 | B2 | 10/2006 | Harris et al. |
| 7,246,745 | B2 * | 7/2007 | Hudnut et al. ................ 235/383 |
| 7,416,118 | B2 | 8/2008 | Throckmorton et al. |
| 7,631,808 | B2 * | 12/2009 | Kundu et al. ................. 235/383 |
| 7,646,887 | B2 * | 1/2010 | Goncalves et al. ........... 382/103 |
| 7,780,081 | B1 * | 8/2010 | Liang ............................ 235/383 |
| 2006/0283943 | A1 * | 12/2006 | Ostrowski et al. ............ 235/383 |

* cited by examiner

*Primary Examiner* — Layla Lauchman
(74) *Attorney, Agent, or Firm* — Chapin IP Law, LLC; Barry W. Chapin

(57) ABSTRACT

Methods and apparatus provide for a Cart Inspector to create a suspicion level for a transaction when a video image of the transaction portrays an item(s) left in a shopping cart. Specifically, the Cart Inspector obtains video data associated with a time(s) of interest. The video data originates from a video camera that monitors a transaction area. The Cart Inspector analyzes the video data with respect to target image(s) associated with a transaction in the transaction area during the time(s) of interest. The Cart Inspector creates an indication of a suspicion level for the transaction based on analysis of the target image(s). Creation of a high suspicion level for the transaction indicates that the transaction's corresponding video images most likely portray occurrences where the purchase price of an item transported through the transaction area was not included in the total amount paid by the customer.

23 Claims, 13 Drawing Sheets

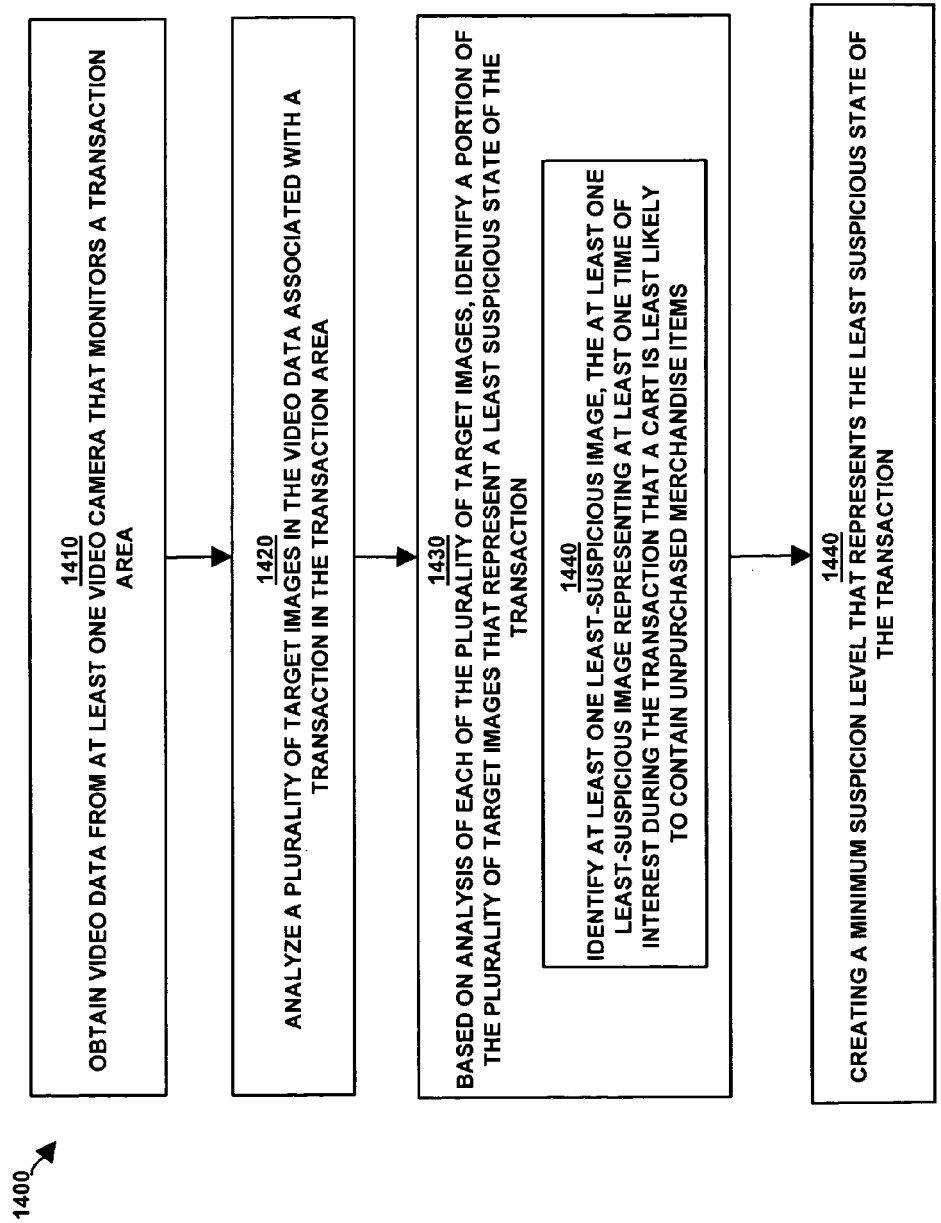

CART INSPECTION FOR SUSPICIOUS ITEMS

PRIORITY TO PROVISIONAL APPLICATION

This U.S. Utility Patent Application claims the benefit of the filing date of earlier filed U.S. Provisional Application for patent having U.S. Ser. No. 60/906,692, filed on Mar. 12, 2007, entitled "Methods and Apparatus for Cart Inspection for Suspicious Items." The entire teaching, disclosure and contents of this provisional patent are hereby incorporated by reference herein in their entirety.

BACKGROUND

Retail establishments commonly utilize point of sale or other transaction terminals, often referred to as cash registers, to allow customers of those establishments to purchase items. As an example, in a conventional department store, supermarket or other retail establishment, a customer collects items for purchase throughout the store and places them in a shopping cart, basket, or simply carries them to a point of sale terminal to purchase those items in a transaction. The point of sale terminal may be staffed with an operator such as a cashier who is a person employed by the store to assist the customer in completing the transaction. In some cases, retail establishments have implemented self-checkout point of sale terminals in which the customer is the operator.

In either case, the operator typically places items for purchase on a counter, conveyor belt or other item input area. The point of sale terminals include a scanning device such as a laser or optical scanner device that operates to identify a Uniform Product Code (UPC) label or bar code affixed to each item that the customer desires to purchase. The laser scanner is usually a peripheral device coupled to a computer that is part of the POS terminal.

To scan an item, the operator picks up each item, one by one, from the item input area and passes that item over a scanning area such as glass window built into the counter or checkout area to allow the laser scanner to detect the UPC code. Once the point of sale computer identifies the UPC code on an item, the computer can perform a lookup in a database to determine the price and identity of the scanned item. Alternatively, in every case where the operator can scan the item, the operator may likewise enter the UPC or product identification code into the terminal manually or through an automatic product identification device such as an RFID reader. The term "scan" is defined generally to include all means of entering transaction items into a transaction terminal. Likewise, the term "scanner" is defined generally as any transaction terminal, automated and/or manual, for recording transaction information.

As the operator scans or enters each item for purchase, one by one, the point of sale terminal maintains an accumulated total purchase price for all of the items in the transaction. For each item that an operator successfully scans or enters, the point of sale terminal typically makes a beeping noise or tone to indicate to the operator that the item has been scanned by the point of sale terminal and in response, the operator places the item into an item output area such as a conveyor belt or other area for retrieval of the items by the customer or for bagging of the items into a shopping bag. Once all items in the transaction are scanned in this manner, the operator indicates to the point of sale terminal that the scanning process is complete and the point of sale terminal displays a total purchase price to the customer who then pays the store for the items purchased in that transaction.

SUMMARY

Conventional transaction terminal systems suffer from a variety of deficiencies. In particular, if an item is intentionally or accidentally not placed on the conveyor belt, conventional transaction terminal systems rely on the operator to notice the omitted item as the customer passes by the point of sale terminal. Upon noticing the omitted item, it is the operator's responsibility to scan the omitted item so that the omitted item's purchase price is added to the total amount to be paid by the customer. Thus, although the omitted item was never placed on the conveyor belt, the total amount paid by the customer should be an aggregate of the omitted item's price and the price of each item that was placed on the conveyor belt and scanned by the operator.

For example, when the customer empties items from a shopping cart onto the conveyor belt, the customer may keep an item in the shopping cart so that it will not be scanned. As the customer passes by the point of sale terminal, if the operator fails to notice the item left in the shopping cart, or willfully ignores the item left in the shopping cart, then the item left in the shopping cart is never scanned. Hence, the price of the item left in the shopping cart is not included in the total amount that the customer pays. The customer thereby avoids having to pay for the item left in the shopping cart, effectively receiving the item for free, which results in a financial loss to the retail establishment.

To detect the occurrence of such events, current retail establishments employ video security cameras to record operator behavior near the point of sale terminal. By recording the operator's behavior, security personnel can review video to determine whether or not the operator is failing to scan items left in shopping carts. However, such an approach is burdensome because security personnel are forced to search through every frame of video in order to find instances when the operator failed to scan items left in shopping carts. This approach is time intensive and requires that security personnel be highly alert when reviewing a multitude of somewhat repetitive and similar video images.

Other conventional systems provide camera systems installed below (or in the side of) retail checkout counters to specifically capture video images of items stored beneath shopping cart carriages as shopping carts move near a point-of-sale terminal. These conventional systems are deficient because retailers are forced to install these camera systems even though the retailers most likely already have security video systems in place. Thus, retailers are burdened by having to invest in and concurrently maintain two separate camera systems. Another deficiency is that the captured video images only portray those items situated in an undercarriage portion of the shopping cart. Thus, if an item involved in the transaction is placed in the shopping cart's main basket, then the captured video images are of no use because such an item would not have been recorded by the camera system mounted below the retail checkout counter.

Techniques discussed herein significantly overcome the deficiencies of conventional applications such as those discussed above as well as additional techniques also known in the prior art. As will be discussed further, certain specific embodiments herein are directed to a Cart Inspector. The one or more embodiments of the Cart Inspector as described herein contrast with conventional systems by performing video analysis of images that portray a transaction near a point of sale terminal. Based on the video analysis, a suspicion level for the transaction is created when the image of the transaction portrays an item(s) left in the shopping cart at a particular time during the transaction. Retailers that already employ security video systems can use the Cart Inspector instead of installing video cameras specifically for the Cart Inspector. Thus, retail environments can enhance their security video systems by having their video data processed by the Cart Inspector.

In general embodiments, transactions given a high suspicion level most likely have corresponding video images which portray occurrences where the purchase price of an item left in a shopping cart (i.e. transported through a transaction area) was not included in the total amount paid by the customer. By knowing which transactions have high suspicion levels, security personnel can efficiently locate the corresponding video images for further review. Thus, the Cart Inspector results in a decrease of video image search costs for security personnel.

The Cart Inspector analyzes video data with respect to a target image associated with a transaction in the transaction area during a time of interest. Based on analysis of the target image, the Cart Inspector creates an indication of a suspicion level for the transaction. It is understood that the target image can be a direct overhead view of a cart, or an elevated perspective view of the cart.

In one embodiment, the target image can portray an image of a cart (e.g. a shopping cart at a critical location in the transaction area). The critical location is an area in the transaction area well-suited for differentiating between suspicious activity and non-suspicious activity. For example, the target image can portray the cart just prior to the cart exiting the retail environment that provides the transaction area. In another example, the target image can portray an image of a cart just after the cart moves away from a point-of-sale terminal in the transaction area. In other examples, the target image can portray an image of a cart next to (or proximate to) a point-of-sale terminal or the target image can portray the cart at the time of interest. It is understood that the cart is any device suitable for transporting items through the transaction area.

In one embodiment, the Cart Inspector obtains video data by identifying a time stamp in transaction data. By defining the time of interest as contemporaneous with the time stamp, the Cart Inspector identifies the target image from a portion of the video data that was created during the time of interest. For example, by identifying a last time stamp in the transaction data, the Cart Inspector can use the time represented by the last time stamp to find video data created at that time. Thus, the Cart Inspector utilizes the last time stamp as a time of interest where it can assume that all paid-for merchandise items were most likely taken out of the cart and placed on the conveyor belt—or otherwise entered into the transaction manually or by hand scanner.

In another embodiment, the Cart Inspector obtains video data that captured activity occurring at a critical location in the transaction area. The time of interest is thereby defined as a moment of time in which the cart was present at the critical location.

In order to analyze the video data, the Cart Inspector performs a comparison of the target image with a reference representation to determine the extent to which that target image portrays imagery of non-suspicious activity or imagery of suspicious activity. The reference representation can be a template that represents a non-suspicious transaction or an empty cart (e.g. an empty shopping cart). In another embodiment, the reference representation can be a template of a non-suspicious cart state that represents an appearance of a cart just after the point-of-sale location in the transaction area.

If the comparison between the target image and the reference representation results in detection of a similarity between the target image and the reference representation, the Cart Inspector sets the indication of the suspicion level for the transaction to a lowest suspicion level.

If the comparison between the target image and the reference representation results in detection of a difference between the target image and the reference representation, the Cart Inspector adjusts the suspicion level of the transaction. For each portion of the target image that portrays an item transported through the transaction area, the Cart Inspector adjusts the suspicion level as a function of a variety of factors related to the item.

Factors used by the Cart Inspector to adjust the suspicion level include, but are not limited to: the location of the item in the cart, the item's shape, the item's color, a characteristic of the item, and a probability that the item qualifies for a false positive classification. Each factor thereby influences the amount the suspicion level is adjusted.

In another embodiment, for multiple transactions captured in the video data, the Cart Inspector creates an indication of a suspicion level for each transaction based on analysis of target images associated with each of the multiple transactions. The Cart Inspector creates a ranking of the multiple transactions (or a ranking of the target images) based on the created suspicion levels.

In another embodiment, the Cart Inspector defines a threshold suspicion level. The Cart Inspector compares the indication of the suspicion level for the transaction based on analysis of the target image with the threshold suspicion level. Upon detecting that the indication of the suspicion level surpasses the threshold suspicion level, the Cart Inspector creates a notification associated with the transaction. In one embodiment, the Cart Inspector creates the real-time notification contemporaneously with the transaction as the transaction occurs in a self-checkout transaction area or an assisted checkout transaction area.

In another embodiment, the Cart Inspector compares a target image of a shopping cart in the transaction area with a reference representation (e.g. stored image of an empty shopping cart), the Cart Inspector determines whether the two images are similar enough to deduce that the shopping cart was most likely empty during a particular time of interest in the transaction area. If there is a similarity, a low suspicion level is created for the transaction because the similarity between the two images signifies that it is highly likely that the customer placed all the items sought to be purchased upon the conveyor belt. However, if there is a difference between the target image and the reference representation, the Cart Inspector assigns a suspicion level to the transaction, such as a default suspicion level.

Upon assigning the level of suspicion to the transaction, the Cart Inspector modifies the level of suspicion based on video analysis with respect to an item(s) represented in the image of the shopping cart. Thus, for a target image of a shopping cart that contains a plurality of items located in a various compartment of the shopping cart, the Cart Inspector can perform video analysis with respect to each item in the target image to create a suspicion level for the transaction. The suspicion level is adjusted according to the location of each item in the cart, the each item's shape, the each item's color, a characteristic of each item, and a probability that each item qualifies for a false positive classification.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium (e.g., tangible computer-readable medium) including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note also that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following more particular description of embodiments of the methods and apparatus for a Cart Inspector, as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

FIG. 13 is an example flowchart of processing steps performed by the Cart Inspector to create a minimum suspicion level that represents a least suspicious state of the transaction according to embodiments herein.

DETAILED DESCRIPTION

Methods and apparatus provide for a Cart Inspector to create a suspicion level for a transaction when a video image of the transaction portrays an item(s) left in a shopping cart. Specifically, the Cart Inspector obtains video data associated with a time(s) of interest. The video data originates from a video camera that monitors a transaction area. The Cart Inspector analyzes the video data with respect to target image (s) associated with a transaction in the transaction area during the time(s) of interest. The Cart Inspector creates an indication of a suspicion level for the transaction based on analysis of the target image(s). Creation of a high suspicion level for the transaction indicates that the transaction's corresponding video images most likely portray occurrences where the purchase price of an item transported through the transaction area was not included in the total amount paid by the customer.

In one example embodiment, the Cart Inspector obtains a target image of a shopping cart carrying a first item in its main basket and a second item in a compartment beneath the basket. The target image can be a direct overhead view of the shopping cart or an elevated view of the shopping cart. It is understood that the Cart Inspector can perform video analysis on a target image of a shopping cart that contains any number items placed in various regions and compartments of the shopping cart.

Upon detecting a lack of similarity between the target image and a reference representation, the Cart Inspector adjusts the transaction's suspicion level based on the location of the first and second item in the cart, the shape of the first and second item, the color of the first and second item, various other characteristics of the first and second item, and a probability that the first and second item qualify for a false positive classification. Each factor can concurrently decrease or increase the suspicion level according to a predefined amount to result in a final suspicion level of the transaction portrayed in the target image.

Figure 1:
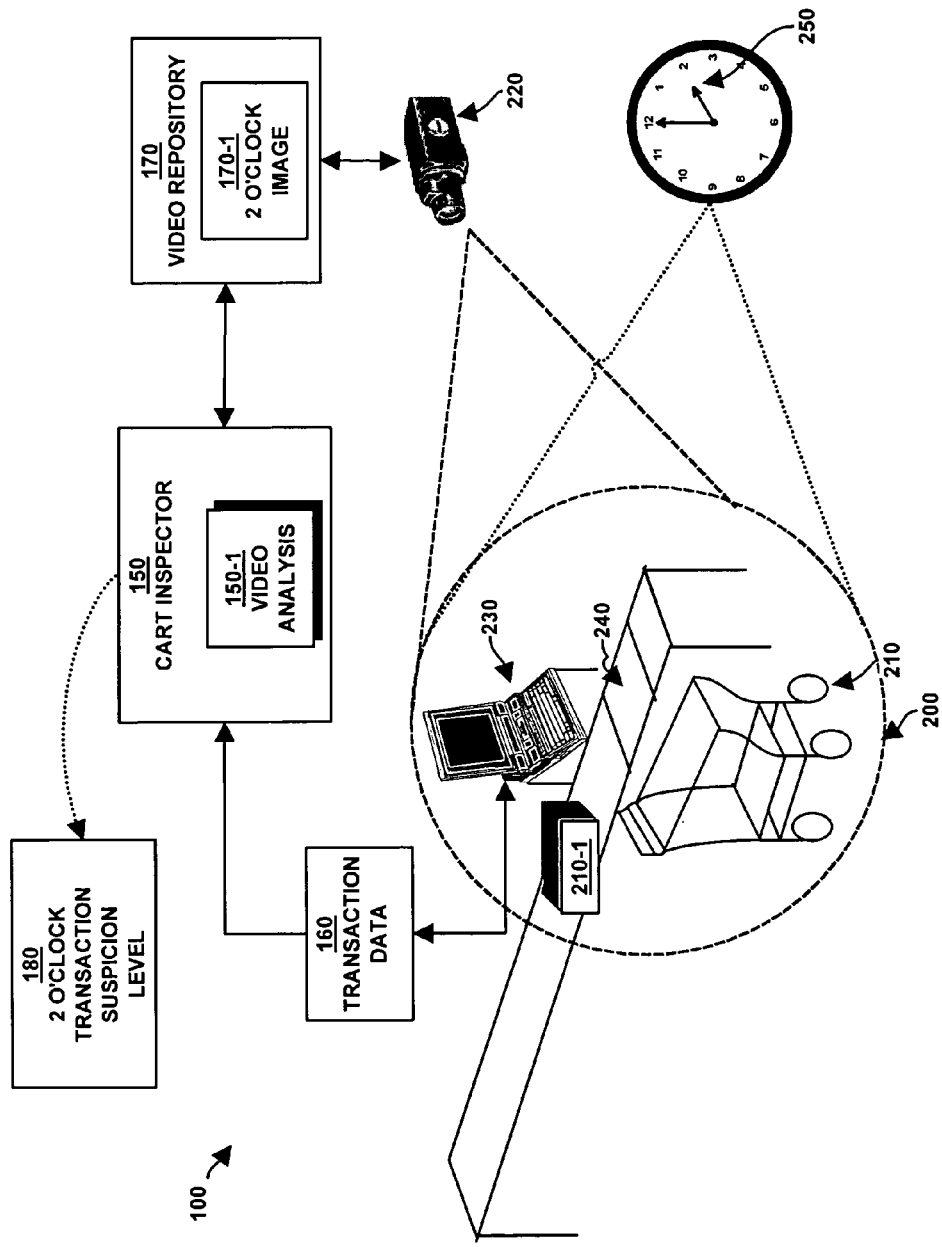
FIG. 1 is an example block diagram of Cart Inspector environment according to embodiments herein.

FIG. 1 is an example block diagram of Cart Inspector environment 100 according to embodiments herein.

According to the workflow of the transaction area 200, when a shopping cart 210 used during a transaction is near a point of sale terminal 230, it should either be empty or transporting bagged items, bulk items, non-store items (e.g. a child, a handbag, a flier, a pet, etc.), or items that are clearly observable to an operator of the point of sale terminal 230. It is understood that the shopping cart 210 can be any device for transporting goods in the transaction area 200, for example, such as a basket or a dolly.

If the shopping cart 210 contains (or is transporting) bagged items, it is highly likely that the items in the bag were placed on a conveyor belt, scanned by the operator of the point of sale terminal 230, and placed in a shopping bag. The appearance of bagged items in the shopping cart 210 thereby creates a high likelihood that the prices of those items in the shopping bag are included in the total amount to be paid by the customer. Thus, the appearance of a shopping cart 210 containing bagged items when it is in the transaction area 200 is not a suspicious event.

Another non-suspicious event is the appearance of a shopping cart 210 transporting bulk items. Bulk items are those items that are too awkward to ever be placed on the conveyor belt, such as a 36-pack of bottled water. Hence, transactions that include a purchase of a bulk item usually never involve the customer emptying the shopping cart 210 because the bulk item is never place on the downward conveyor belt. Instead, it is customary for the operator to manually enter the price of the bulk item when the shopping cart 210 is near the point of sale terminal 230. Thus, when a shopping cart contains a bulk item, it is also likely that the bulk item's price is included in the total amount to be paid by the customer.

When the shopping cart 210 transports a moving item (i.e. an animated object), such as a child or pet, when it is in the transaction area 200, the appearance of the moving item in the shopping cart 210 is a non-suspicious event as well.

However, if the shopping cart 210 is not empty when it is near the point of sale terminal 250 and the item transported by the shopping cart 210 is not a bagged item, a bulk item, or a moving item, then the item is a loose item. A loose item is an item that most likely was never placed on the conveyor belt and scanned by the operator of the point of sale terminal 250. Hence, the appearance of the loose item in the shopping cart 210 is a suspicious event because the loose item's transportation by the shopping cart 210 indicates that the loose item's price may not be included in the total amount to be paid by the customer.

In order to capture video images of the shopping cart 210 during a time of interest 250 during a transaction (or when the shopping cart 210 is near the point of sale terminal 230 or a scanner 240), the environment 100 includes a video camera 220, placed above the transaction area 200. The video camera 220 records operator and customer activity in the transaction area 200 and stores the recorded video images in a video repository 170.

For example, as illustrated in FIG. 1, at 2 o'clock (i.e. the time of interest 250), the shopping cart 210 is involved in a transaction that involves the purchase of an item 210-1. Since the item 210-1 has been placed on a conveyor belt, the video camera 220 records an image 170-1 of the shopping cart 210 as being empty of any items.

In addition, as the item 210-1 is scanned by the operator of the point of sale terminal 230, transaction data 160 is created. For example, the transaction data can include the time of purchase, the time the item 210-1 was scanned, information identifying the item 210-1, the item price, and total amount paid by the customer.

In order to create an indication of a suspicion level 180 for the purchase of the item 210-1, the Cart Inspector 150 performs video analysis 150-1 of the video image 170-1 that portrays the shopping cart 210 at 2 o'clock.

Since the video image 170-1 (i.e. the target image) shows that the shopping cart 210 was empty at 2 o'clock when it was in the transaction area 200, it is likely that the item's price 210-1 was included in the total amount paid by the customer. The Cart Inspector 150 creates an indication of a low level of suspicion 180 for the transaction recorded in the video image 170-1. Thus, before reviewing the video image 170-1, the indication of the low level of suspicion 180 informs security personnel that the transaction involving the item 210-1 most likely did not result in a financial loss to the retail establishment.

Figure 2:
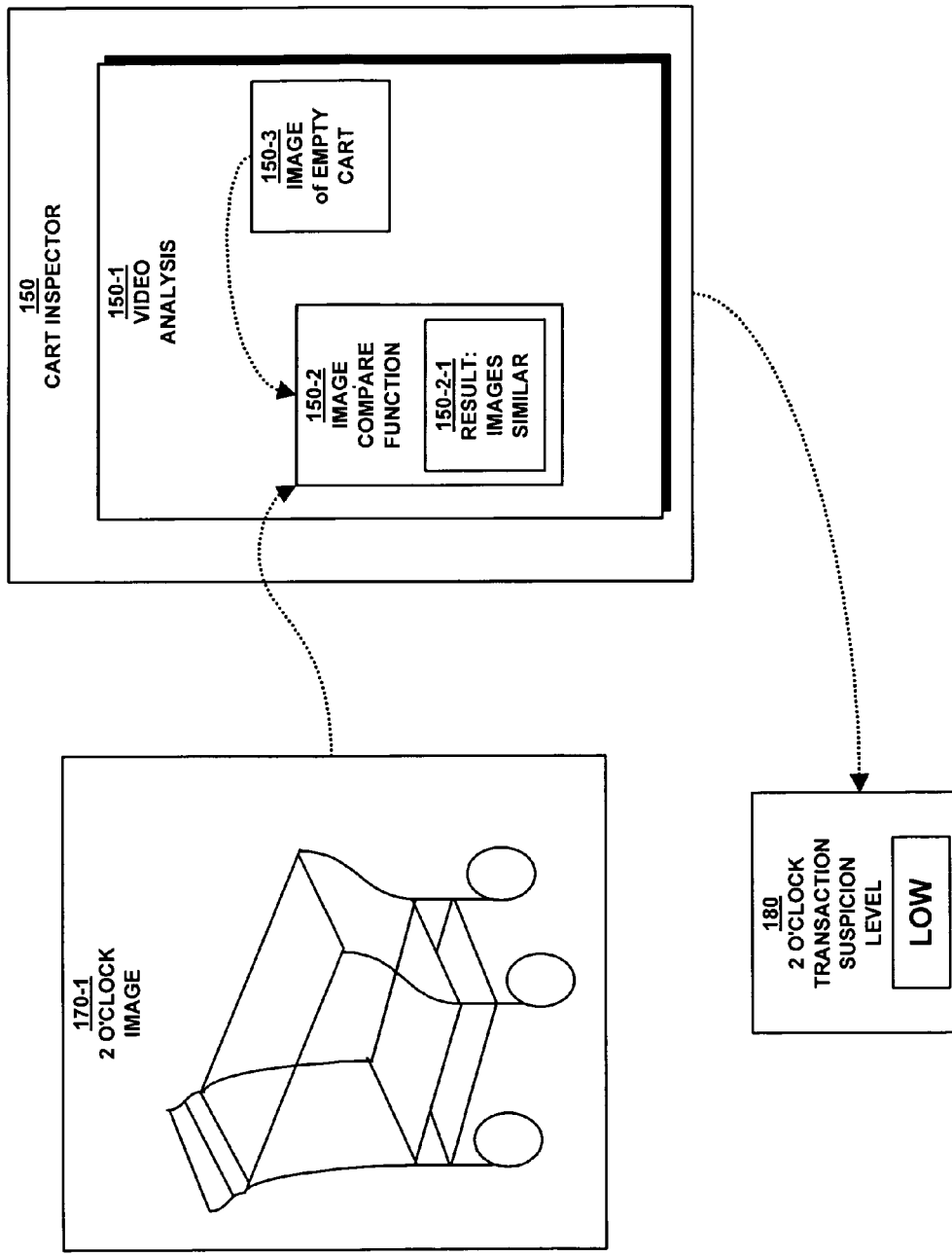
FIG. 2 is an example block diagram of a computer system configured with a Cart Inspector creating a low suspicion level for a transaction according to embodiments herein.

Turning now to FIG. 2, FIG. 2 illustrates an example block diagram of a computer system configured with a Cart Inspector 150 creating a low suspicion level 180 for a transaction according to embodiments herein.

During video analysis 150-1, the Cart Inspector 150-1 obtains a target image. The target image can be a video image 170-1 that shows the shopping cart 210 was empty at 2 o'clock when it was in the transaction area 200. In addition, the Cart Inspector 150-1 obtains a reference representation, which can be a predefined image of an empty cart 150-3.

The Cart Inspector 150 performs an image comparison function 150-2 to compare both images 170-1, 150-3. Since both the images 170-1, 150-3 depict an empty shopping cart, the result 150-2-1 of the image comparison function 150-2 is a detection of a similarity between the images 170-1, 150-3. The similarity between the images 170-1, 150-3 indicates that the transaction recorded in the video image 170-1 that shows the shopping cart 210 was empty at 2 o'clock was most likely a non-suspicious transaction. Based on the video analysis 150-1 of the image 170-1, the Cart Inspector 150 creates an indication of a low suspicion level 180 for the transaction (i.e. the purchase of the item 210-1 and 2 o'clock).

Figure 3:
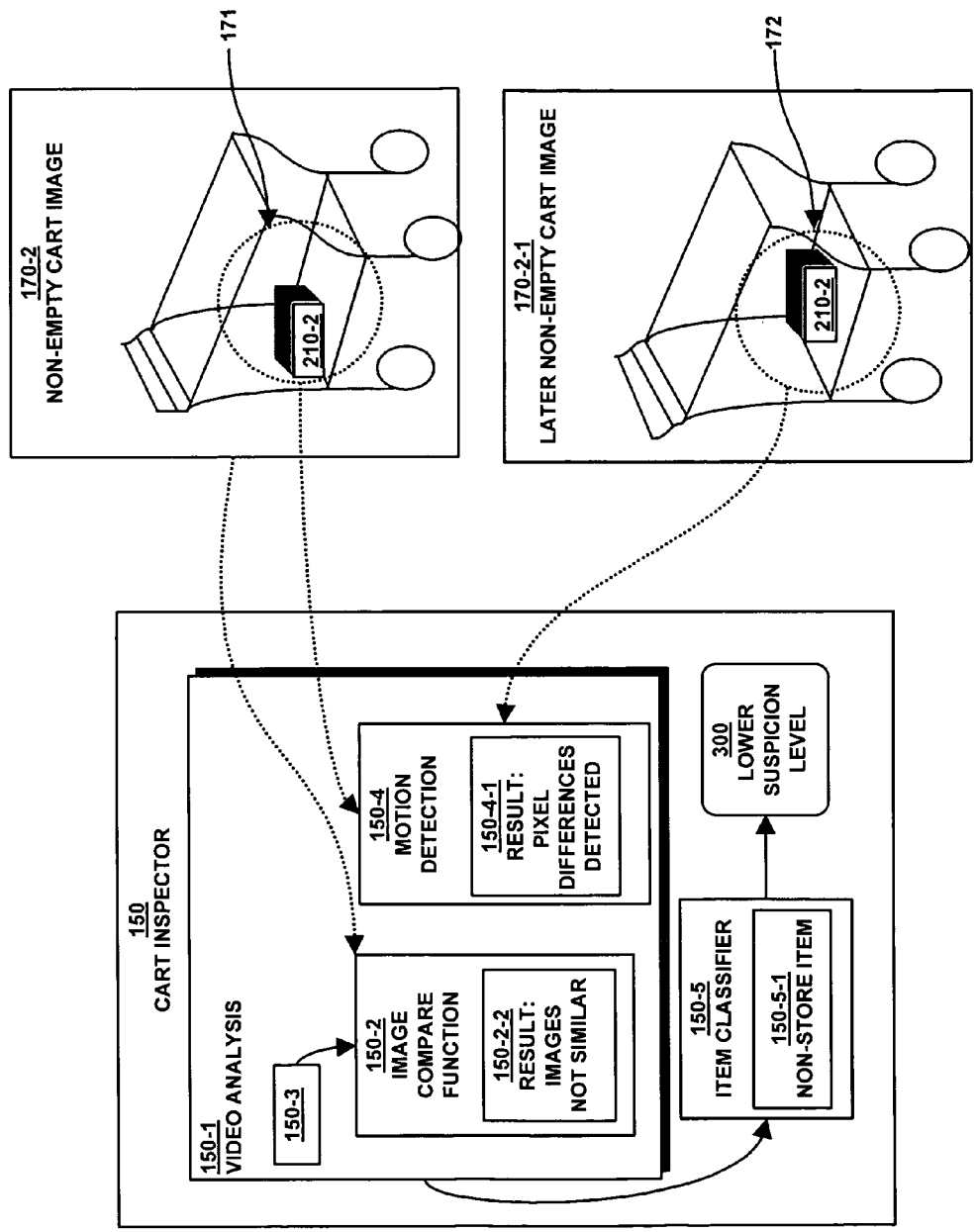
FIG. 3 is an example block diagram of a computer system configured with a Cart Inspector classifying a shopping cart item, which is portrayed in images of a shopping cart, as a non-store item (i.e. a moving item) according to embodiments herein.

Referring now to FIG. 3, FIG. 3 is an example block diagram of a computer system configured with a Cart Inspector 150 classifying a shopping cart item 210-2, which is portrayed in images 170-2, 170-2-1 of a shopping cart 210, as a moving item according to embodiments herein.

During video analysis 150-1, the Cart Inspector 150-1 obtains a target image, such as a video image 170-2 of a non-empty shopping cart. In addition, the Cart Inspector 150-1 obtains a reference representation such as a predefined image of an empty cart 150-3.

The Cart Inspector 150 performs an image comparison function 150-2 to compare both images 170-2, 150-3. Since the image 170-2 is that of a non-empty shopping cart, the result 150-2-2 of the image comparison function 150-2 is a detection of a difference between the images 170-2, 150-3. The difference between the images 170-2, 150-3 indicates that the transaction recorded in the video image 170-2 may be either an image of a suspicious transaction or an image of a false positive condition.

To determine whether the image 170-2 is an image of a moving item present in a shopping cart (i.e. a false positive condition), the video analysis 150-1 includes a motion detection function 150-4. The motion detection function 150-4 identifies a portion 171 of the non-empty shopping cart image 170-2 which corresponds with the item 210-2. In addition, the Cart Inspector 150 identifies another video image 170-2-1 of the same transaction from the video repository 170. For example, a video image 170-2-1 taken a few seconds later (or earlier) can be obtained by the Cart Inspector 150. The Cart Inspector 150 further identifies a portion 172 of the later image 170-2-1 which corresponds with the item 210-2.

The motion detection function 150-4 processes the two portions 171, 172 in order to identify a motion-based variation between the images' pixels. If the item 210-2 was moving when the images 170-2, 170-2-1 were created, the motion detection function 150-4 results 150-4-1 in a detection of the pixel differences.

Based on the result 150-2-1 of the image compare function 150-2 and the result 150-4-1 of the motion detection function 150-4, an item classifier 150-5 classifies the item 210-2 as a non-store item, such as a moving item (e.g. a child, a pet). Since presence of a moving item in a shopping cart is a non-suspicious event, the Cart Inspector 150 lowers the suspicion level 300 for the transaction with respect to the item's 210-2 presence in the shopping cart.

In another embodiment, the Cart Inspector 150 detects a moving item by applying a time-based recurrent motion measurement. The Cart Inspector 150 uses an item silhouette and a cart silhouette from the non-empty cart image 170-2, and an amount of time to compute a motion value for each pixel in the total item silhouette.

Figure 4:
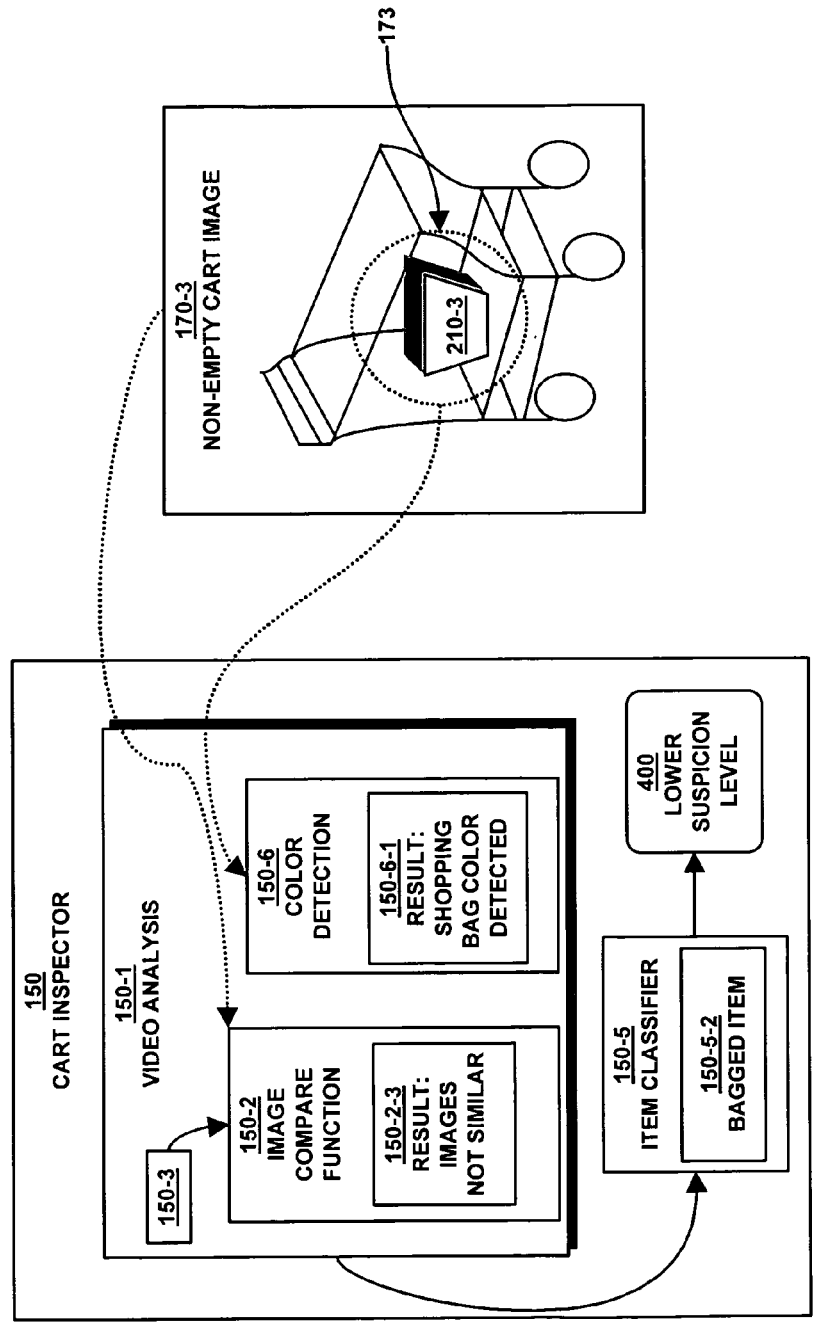
FIG. 4 is an example block diagram of a computer system configured with a Cart Inspector classifying a shopping cart item, which is portrayed in an image of a shopping cart, as a bagged item according to embodiments herein.

Regarding FIG. 4, FIG. 4 is an example block diagram of a computer system configured with a Cart Inspector classifying a shopping cart item 210-3, which is portrayed in an image 170-3 of a shopping cart, as a bagged item according to embodiments herein. It is understood that the shopping cart item 210-3 can be located anywhere in the shopping cart and need not be in the basket area of the shopping cart for the Cart Inspector 150 to classify the shopping cart item 210-3. For example, the shopping cart item can be situated beneath the basket area of the shopping cart and the Cart Inspector 210-3 will classify the shopping cart item 210-3 as well.

During video analysis 150-1, the Cart Inspector 150-1 obtains a target image, such as, for example, a video image 170-3 of a non-empty shopping cart. In addition, the Cart Inspector 150-1 obtains a reference representation, such as a predefined image of an empty cart 150-3.

The Cart Inspector 150 performs an image comparison function 150-2 to compare both images 170-3, 150-3. Since the image 170-3 is that of a non-empty shopping cart, the result 150-2-3 of the image comparison function 150-2 is a detection of a difference between the images 170-3, 150-3. The difference between the images 170-3, 150-3 indicates that the transaction recorded in the video image 170-3 may be either an image of a suspicious transaction or an image of a false positive condition.

To determine whether the image 170-3 is an image of a bagged item present in a shopping cart (i.e. a false positive condition), the video analysis 150-1 includes a color detection function 150-6. The color detection function 150-6 processes pixels from a portion 173 of the image 170-3 that corresponds with the item 210-3 in the shopping cart.

For example, in one embodiment, the color detection function 150-6 uses a color model on a precompiled set of bag samples. Since store bags are constant and are uniform in color, a probability distribution function (PDF) can be computed for each bag type. A bag confidence level can be generated for each pixel in the portion 173 (e.g. a total item silhouette) by using the PDF to calculate a likelihood that it is a bag pixel.

When the color detection function 150-6 results 150-6-1 in detecting the color of the shopping bag in the portion 173 of the image 170-3 of the non-empty shopping cart, the item classifier 150-5 classifies the item 210-3 as a bagged item. Since presence of a bagged item in a shopping cart is a non-suspicious event, the Cart Inspector 150 lowers the suspicion level 400 for the transaction with respect to the item's 210-3 presence in the shopping cart.

Figure 5:
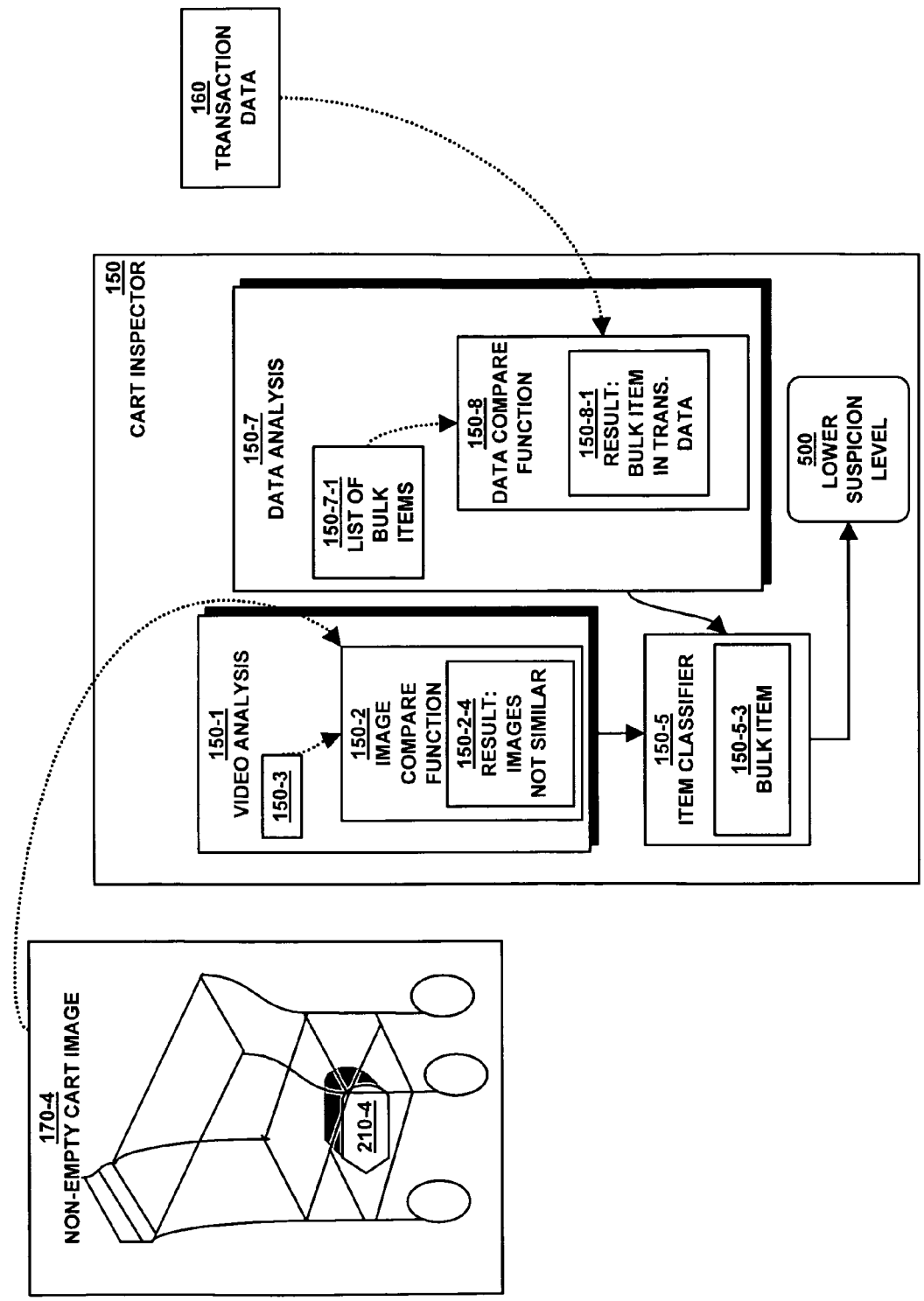
FIG. 5 is an example block diagram of a computer system configured with a Cart Inspector classifying a shopping cart item as a bulk item according to embodiments herein.

Turning now to FIG. 5, FIG. 5 is an example block diagram of a computer system configured with a Cart Inspector 150 classifying a shopping cart item 210-4 as a bulk item according to embodiments herein.

During video analysis 150-1, the Cart Inspector 150-1 obtains a video image 170-4 of a non-empty shopping cart. In addition, the Cart Inspector 150-1 obtains a predefined image of an empty cart 150-3.

The Cart Inspector 150 performs an image comparison function 150-2 to compare both images 170-4, 150-3. Since the image 170-4 is that of a non-empty shopping cart, the result 150-2-4 of the image comparison function 150-2 is a detection of a difference between the images 170-4, 150-3. The difference between the images 170-4, 150-3 indicates that the transaction recorded in the video image 170-4 may be either an image of a suspicious transaction or an image of a false positive condition.

To determine whether the image 170-4 is an image of a bulk item present in a shopping cart (i.e. a false positive condition), the Cart Inspector 150 performs data analysis 150-7 on transaction data 160. The Cart Inspector 150 obtains a predefined list of bulk items 150-7-1 along with the transaction data 160. The predefined list of bulk items 150-7-1 describes items that are commonly left in shopping carts during a transaction.

A data compare function 150-8 searches the transaction data 160 for information related to any bulk item listed in the predefined list of bulk items 150-7-1. When the data compare function finds such bulk item information in the transaction data 160, the data compare function 150-8 creates a result 150-8-1 indicating the presence of such bulk item information.

Based on the result, 150-8-1, the item classifier 150-5 classifies the item 210-4 as a bulk item. Since presence of a bulk item in a shopping cart is a non-suspicious event, the Cart Inspector 150 lowers the suspicion level 500 for the transaction with respect to the item's 210-4 presence in the shopping cart.

In another embodiment, for large, heavy, or awkward items, it is common for the operator of a point of sale terminal 230 to scan the item 210-4 with a hand scanner or enter the item's identification number into the point of sale terminal 230 by hand. To detect bulk items, the Cart Inspector 150 obtains a precompiled item library (including image templates, features, item visual representations, etc.). This library defines those large, heavy, or awkward items that are customarily left in shopping carts by customers during a transaction.

The Cart Inspector 150 defines a segment of the image 170-4 of the non-empty cart. The segment includes the representation of the item 210-4 portrayed in the image 170-4 of the non-empty cart.

When a transaction completes, all of the item information from the transaction data 160 is obtained. The precompiled item library is then queried for visual representations (e.g. images, templates, geometric property information) of each item described in the transaction data 160.

The Cart Inspector 250 compares the visual representation of each item described in the transaction data with the segment that includes the representation of the item 210-4 portrayed in the image 170-4 of the non-empty cart. If the segment correlates with any of the visual representations of the items described in the transaction data 160, then the suspicion level for the transaction is decreased with respect the item 210-4. However, if the segment fails to correlate with any of the visual representations of the items described in the transaction data 160, then the suspicion level for the transaction is increased with respect the item 210-4.

There are many methods available for image comparison including histogram color analysis, geometric analysis, and edge comparison analysis. One embodiment employs the use of a multi-resolution correlation technique. The images in the database are transformed into a pyramid image using a wavelet transform. A correlation score is computed and a match is determined by comparing against a confidence threshold. Those items that have no matches are considered suspicious.

Figure 6:
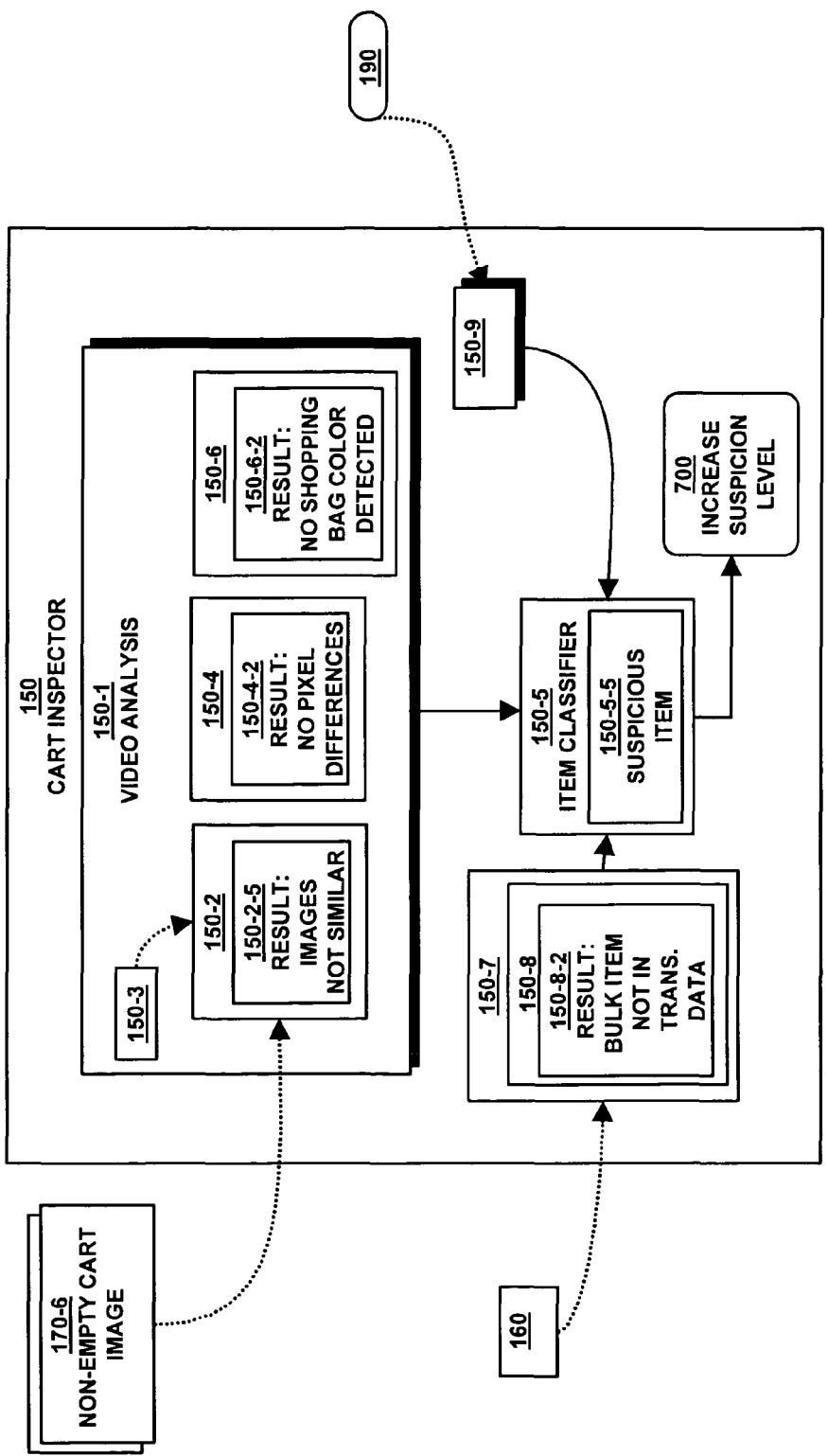
FIG. 6 is an example block diagram of a computer system configured with a Cart Inspector classifying a shopping cart item, which is portrayed in an image of a shopping cart, as a suspicious item according to embodiments herein.

FIG. 6 is an example block diagram of a computer system configured with a Cart Inspector 150 classifying a shopping cart item, which is portrayed in an image 170-6 of a shopping cart, as a suspicious item according to embodiments herein.

The Cart Inspector 150 performs an image comparison function 150-2 to compare both images 170-6, 150-3. Since the image 170-6 is that of a non-empty shopping cart, the result 150-2-5 of the image comparison function 150-2 is a detection of a difference between the images 170-6, 150-3. The difference between the images 170-6, 150-3 indicates that the transaction recorded in the video image 170-6 may be either an image of a suspicious transaction or an image of a false positive condition. Thus, if the Cart Inspector 150 detects that no false positive condition exists, then the image 170-6 of the non-empty cart most likely is a recording of a suspicious transaction.

To determine whether the image 170-6 is an image of a moving item present in a shopping cart (i.e. a false positive condition), the video analysis 150-1 performs the motion detection function 150-4. If the item was moving when it was in the shopping cart, the motion detection function 150-4 results in a detection of the pixel differences (as discussed above with regard to FIG. 3). However, based on video analysis 150-1 involving the image 170-6 of the non-empty shopping cart, the results 150-4-2 of the motion detection function 150-4 fails to detect pixel difference. Thus, the item in the shopping cart portrayed in the image 170-6 is most likely not a moving item.

To determine whether the image 170-6 is an image of a bagged item present in a shopping cart (i.e. a false positive condition), the video analysis 150-1 performs the color detection function 150-6. The color detection function 150-6 processes pixels from a portion of the image 170-6 that corresponds with the item in the shopping cart. Based on video analysis 150-1, the results 150-6-2 of the color detection function 150-6 fails to detect a distribution of color corresponding with a shopping bag. Thus, the item in the shopping cart portrayed in the image 170-6 is most likely not a bagged item.

To determine whether the image 170-6 is an image of a bulk item present in a shopping cart (i.e. a false positive condition), the Cart Inspector 150 performs data analysis 150-7 on transaction data 160. The data compare function 150-8 searches the transaction data 160 for information related to any bulk item listed in the predefined list of bulk items 150-7-1. When the data compare function 150-8 fails to find bulk item information in the transaction data 160, the data compare function 150-8 creates a result 150-8-2 indicating that there is no bulk item information in the transaction data 160.

Since the item portrayed in the image 170-6 as present in the shopping cart is not a moving item, a bulk item, or a bagged item, it is highly likely that the item was never placed on the conveyor belt and/or scanned by the operator of the point of sale terminal 230. Thus, there is a probability that the item's price was not included in the total price paid by the customer. The item classifier 150-5 thereby classifies the item as a suspicious item 150-5-5 which increases the suspicion level 700 for the transaction with respect to the item portrayed in the image 170-6 as present in the shopping cart.

Figure 7:
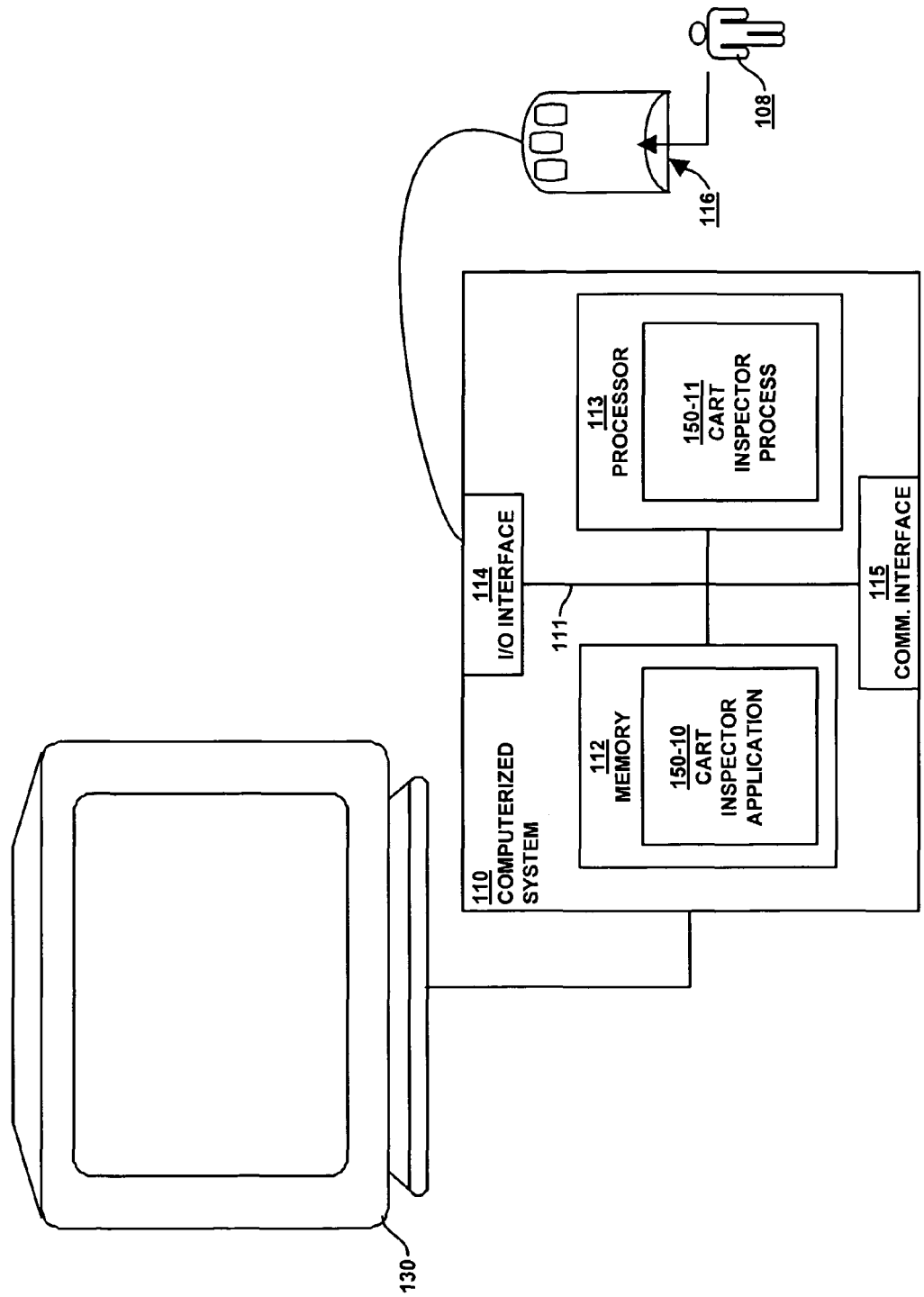
FIG. 7 is an example block diagram illustrating an architecture of a computer system that executes, runs, interprets, operates or otherwise performs a Cart Inspector application and/or Cart Inspector process according to embodiments herein.

FIG. 7 is an example block diagram illustrating an architecture of a computer system 110 that executes, runs, interprets, operates or otherwise performs a Cart Inspector application 150-10 and/or Cart Inspector process 150-11 (e.g. an executing version of a Cart Inspector 150 as controlled or configured by user 108) according to embodiments herein.

Note that the computer system 110 may be any type of computerized device such as a personal computer, a client computer system, workstation, portable computing device, console, laptop, network terminal, etc. This list is not exhaustive and is provided as an example of different possible embodiments.

In addition to a single computer embodiment, computer system 110 can include any number of computer systems in a network environment to carry the embodiments as described herein.

As shown in the present example, the computer system 110 includes an interconnection mechanism 111 such as a data bus, motherboard or other circuitry that couples a memory system 112, a processor 113, an input/output interface 114, and a display 130. If so configured, the display can be used to present a graphical user interface of the Cart Inspector 150 to user 108. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system. As mentioned above, depending on the embodiment, the Cart Inspector application 150-10 and/or the Cart Inspector process 150-11 can be distributed and executed in multiple nodes in a computer network environment or performed locally on a single computer.

During operation of the computer system 110, the processor 113 accesses the memory system 112 via the interconnect 111 in order to launch, run, execute, interpret or otherwise perform the logic instructions of the Cart Inspector application 150-1. Execution of the Cart Inspector application 150-10 in this manner produces the Cart Inspector process 150-2. In other words, the Cart Inspector process 150-11 represents one or more portions or runtime instances of the Cart Inspector application 150-10 (or the entire application 150-1) performing or executing within or upon the processor 113 in the computerized device 110 at runtime.

The Cart Inspector application 150-10 may be stored on a computer readable medium (such as a floppy disk), hard disk, electronic, magnetic, optical, or other computer readable medium. It is understood that embodiments and techniques discussed herein are well suited for other applications as well.

Those skilled in the art will understand that the computer system 110 may include other processes and/or software and hardware components, such as an operating system. Display 130 need not be coupled directly to computer system 110. For example, the Cart Inspector application 150-10 can be executed on a remotely accessible computerized device via the communication interface 115.

Regarding the flowcharts 900, 1000, 1100, 1200 1300 and 1400, FIG. 8 through FIG. 13 illustrate various embodiment of the Cart Inspector 150. The rectangular elements in flowcharts 900, 1000, 1100, 1200,1300 and 1400 represent "processing blocks" and represent computer software instructions or groups of instructions upon a computer readable medium. Additionally, the processing blocks represent steps performed by hardware such as a computer, digital signal processor circuit, application specific integrated circuit (ASIC), etc.

Flowcharts 900, 1000, 1100, 1200, 1300 and 1400 do not necessarily depict the syntax of any particular programming language. Rather, flowcharts 900, 1000, 1100, 1200, 1300 and 1400 illustrate the functional information one of ordinary skill in the art requires to fabricate circuits or to generate computer software to perform the processing required in accordance with the present invention. It will be appreciated by those of ordinary skill in the art that unless otherwise indicated herein, the particular sequence of steps described is illustrative only and may be varied without departing from the spirit of the invention. Thus, unless otherwise stated, the steps described below are unordered, meaning that, when possible, the steps may be performed in any convenient or desirable order.

Figure 8:
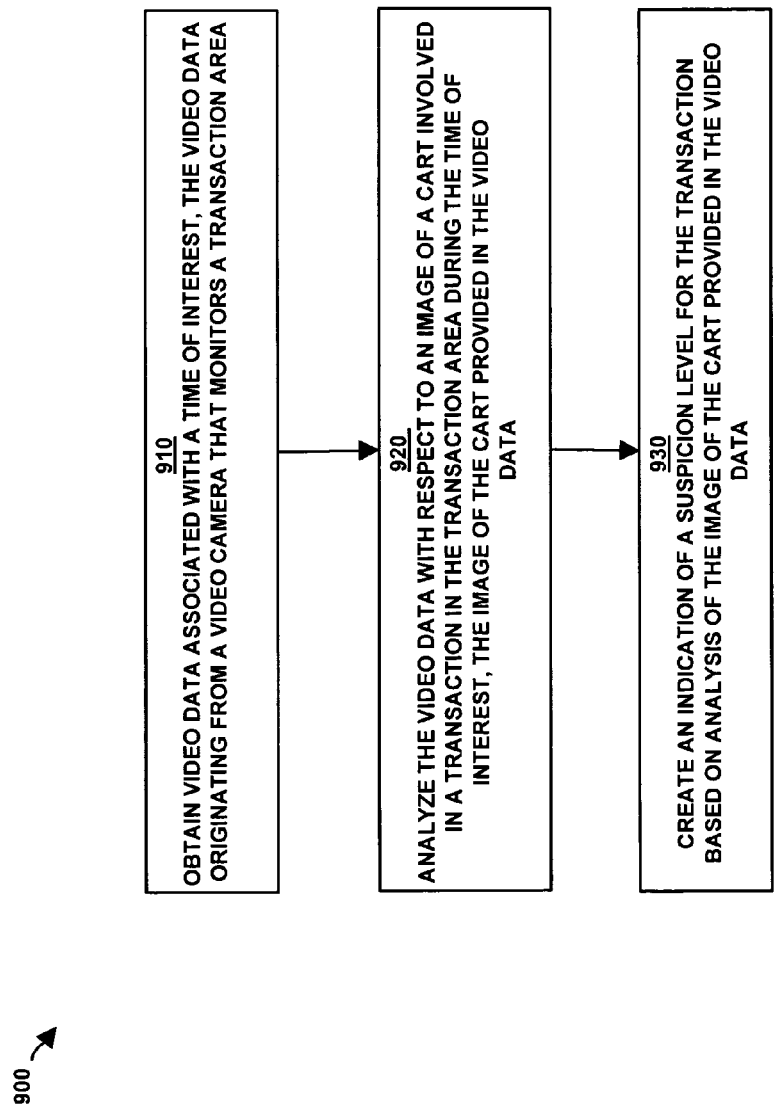
FIG. 8 is an example flowchart of processing steps performed by the Cart Inspector to create an indication of a suspicion level for a transaction according to embodiments herein.

FIG. 8 is an example flowchart 900 of processing steps performed by the Cart Inspector 150 to create an indication of a suspicion level 180 for a transaction according to embodiments herein.

At step 910, the Cart Inspector 150 obtains video data associated with a time of interest 250. The video data originates from a video camera 220 that monitors a transaction area 200.

At step 920, the Cart Inspector 150 analyzes the video data 170-1 with respect to an image of a cart 170-1 involved in a transaction in the transaction area 200 during the time of interest 250. The video data includes the image of the cart 170-1.

At step 930, the Cart Inspector 150 creates an indication of a suspicion level 180 for the transaction based on analysis of the one image of the cart 170-1 provided in the video data.

Figure 9:
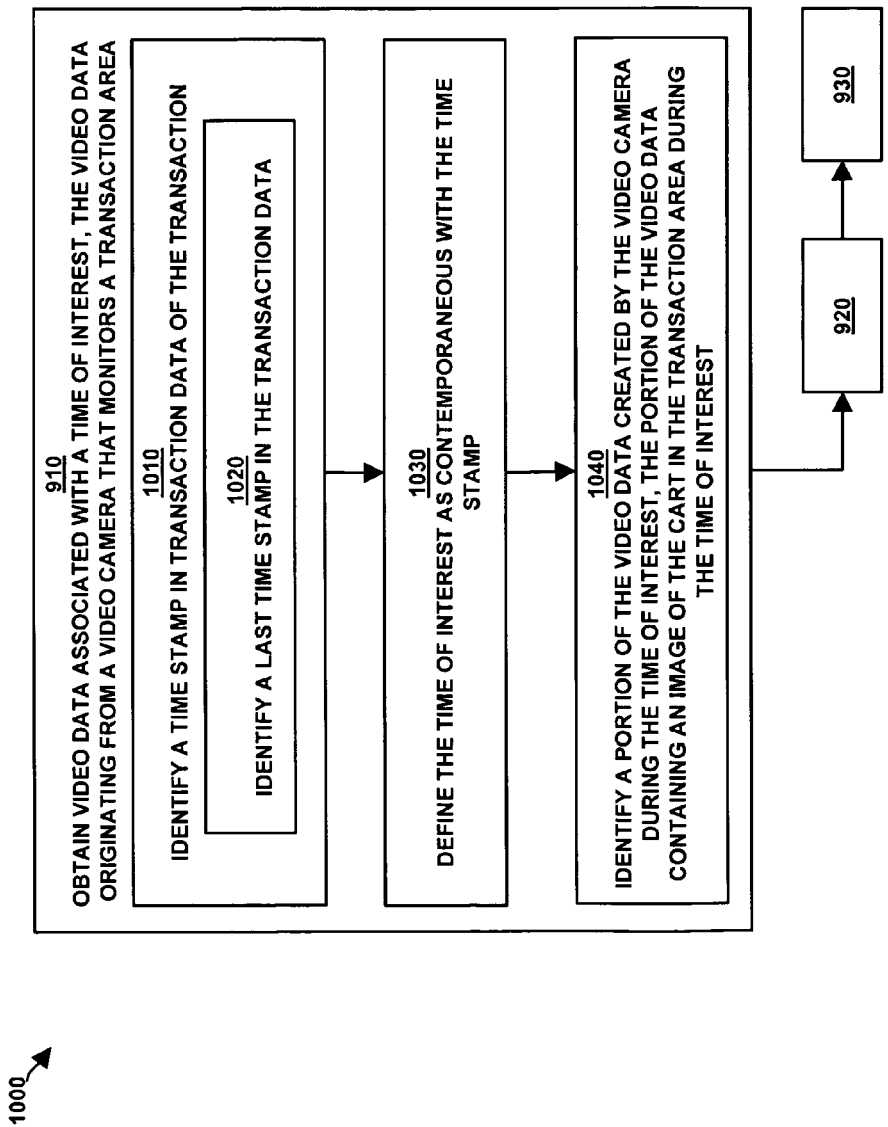
FIG. 9 is an example flowchart of processing steps performed by the Cart Inspector to obtain video data associated with a time of interest according to embodiments herein.

FIG. 9 is an example flowchart 1000 of processing steps performed by the Cart Inspector to obtain video data associated with a time of interest 250 according to embodiments herein.

At step 1010, the Cart Inspector 150 identifies a time stamp in transaction data 160 of a transaction.

At step 1020, the Cart Inspector 150 identifies the time stamp as the last time stamp that appears in the transaction data 160.

At step 1030, the Cart Inspector 150 defines the one time of interest 250 as contemporaneous with the time stamp.

At step 1040, the Cart Inspector 150 identifies a portion(s) of the video data created by the video camera 220 during the time of interest 250 which contain an image(s) of the cart 170-1 in the transaction area during time of interest 250.

In another embodiment, the Cart Inspector 150 defines a critical location in the transaction area 200, such as the location of a scanning device 240 or the point of sale terminal 230.

The Cart Inspector 150 defines the time of interest 250 as when the cart is present at (or proximate to) the critical location (e.g. the scanning device 240, point of sale terminal 230) in the transaction area 200.

The Cart Inspector 150 identifies a portion of the video data, created by the video camera 220 during the time of interest 250, which contains an image 170-1 of the cart at the critical location in the transaction area 200 during the time of interest 250.

Figure 10:
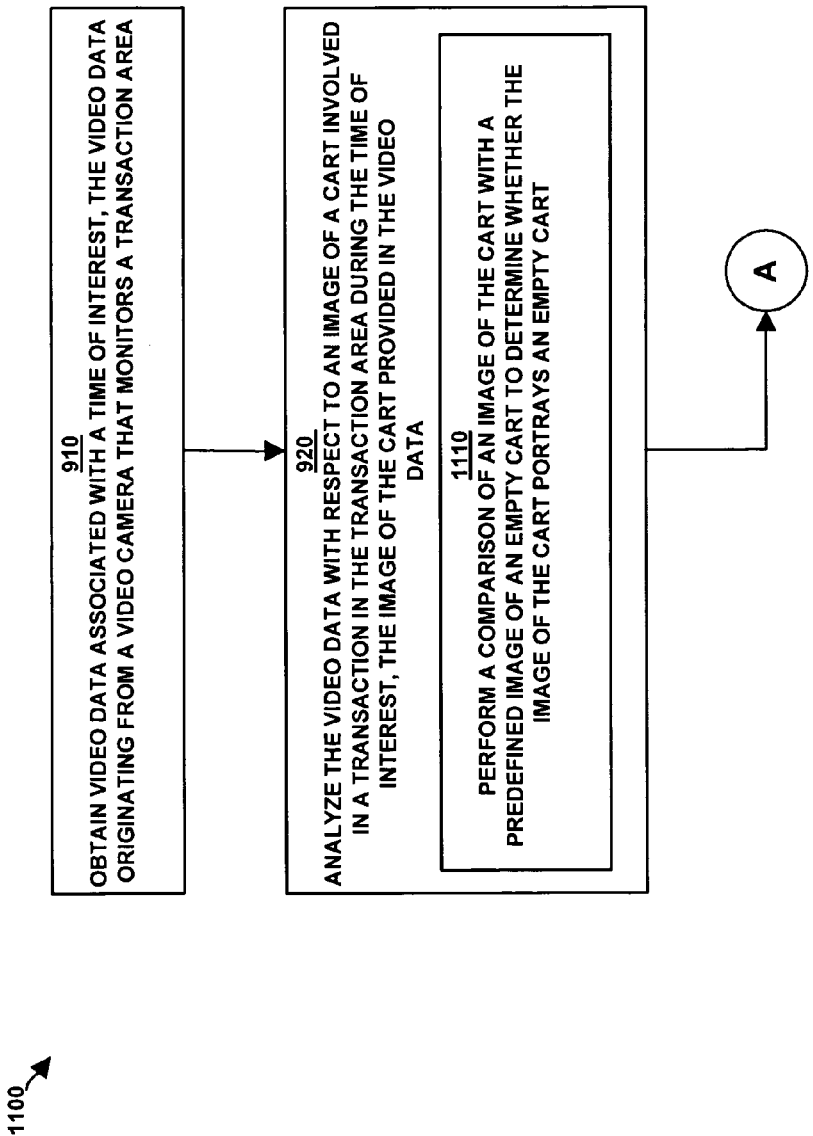
FIGS. 10-11 are example flowcharts of processing steps performed by the Cart Inspector to compare an image of a shopping cart with a predefined image of an empty shopping cart according to embodiments herein.
Figure 11:
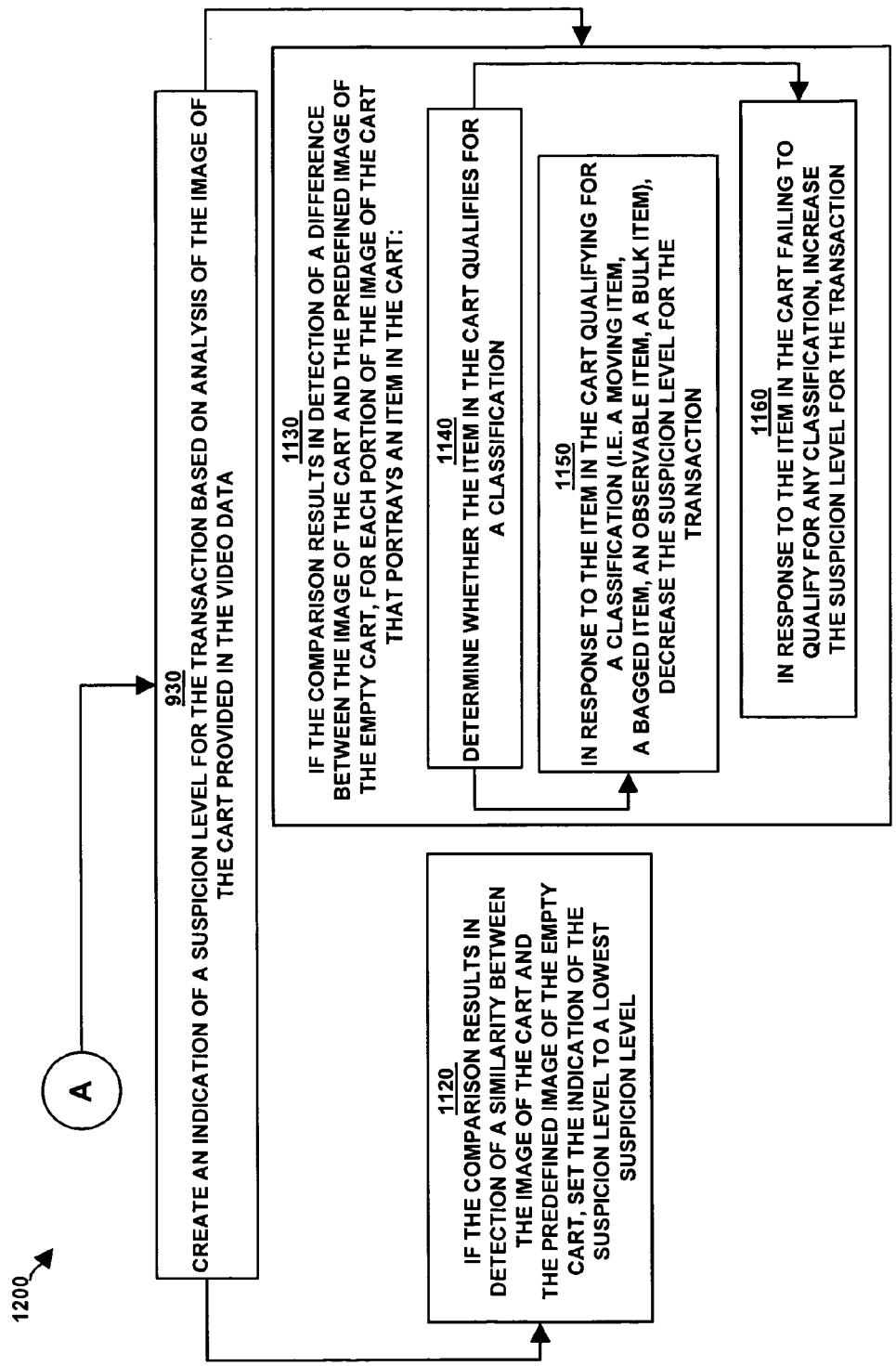

FIGS. 10-11 are example flowcharts 1100, 1200 of processing steps performed by the Cart Inspector 150 to compare an image of a shopping cart 170-1 with a predefined image of an empty shopping cart 150-3 according to embodiments herein.

At step 1110, the Cart Inspector 150 performs a comparison of the image of the cart 170-1 with a predefined image of an empty cart 150-3 to determine whether the image of the cart 170-1 portrays an empty cart.

At step 1120, if the comparison results in detection of a similarity between the two images 170-1, 150-3, the Cart Inspector 150 sets the indication of the suspicion level to a lowest suspicion level 180.

As illustrated in FIG. 11, at step 1130, if the comparison results in detection of a difference between the two images 170-1, 150-3, the Cart Inspector 150 performs steps 1140-1160 for each portion of the image of the cart 170-1 that portrays an item(s) in the cart:

At step 1140, the Cart Inspector 150 determines whether the item (e.g. item 210-2, 210-3, 210-4 or 210-5) in the cart qualifies for a classification.

At step 1150, in response to the item (e.g. item 210-2, 210-3, 210-4 or 210-5) in the cart qualifying for a classification, the Cart Inspector 150 decreases the suspicion level 300, 400, 500 for the transaction.

At step 1160, in response to the item (e.g. item 210-2, 210-3, 210-4 or 210-5) in the cart failing to qualify for any classification, the Cart Inspector 150 increases the suspicion level for the transaction.

Figure 12:
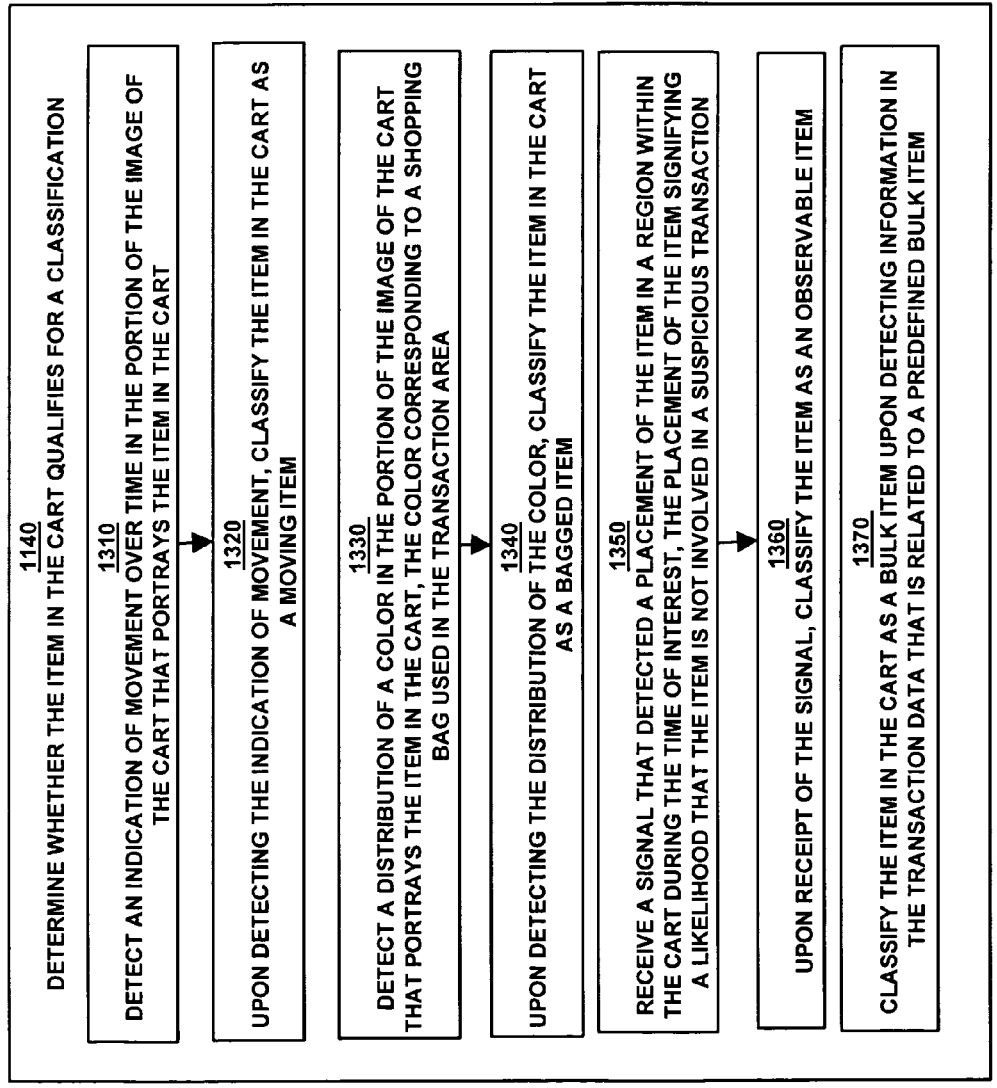
FIG. 12 is an example flowchart of processing steps performed by the Cart Inspector to determine whether a shopping cart item portrayed in an image of a shopping cart qualifies as a moving item, a bagged item, an observable item or a bulk item according to embodiments herein.

FIG. 12 is an example flowchart 1300 of processing steps performed by the Cart Inspector 150 to determine whether a shopping cart item (e.g. item 210-2, 210-3, 210-4 or 210-5) portrayed in an image of a shopping cart qualifies as a moving item, a bagged item, an observable item or a bulk item according to embodiments herein.

To process an occurrence of a first false positive condition, at step 1310, the Cart Inspector 150 detects an indication of movement over time in a portions 171, 172 of images of the cart 170-2, 170-2-1 that portray a item 210-2 in the cart.

At step 1320, upon detecting the indication of movement, the Cart Inspector 150 classifies the item 210-2 in the cart as a non-store item 150-5-1, such a moving item (e.g. a child, a pet).

To process an occurrence of a second false positive condition, at step 1330, the Cart Inspector 150 detects a distribution of a color in a portion 173 of an image of the cart 170-3 that portrays the item 210-3 in the cart. The detected color corresponds to a shopping bag used in the transaction area 200.

At step 1340, upon detecting the distribution of the color, the Cart Inspector 150 classifies the item 210-3 in the cart as a bagged item 150-5-2.

To process an occurrence of a third false positive condition, at step 1350, the Cart Inspector 150 receives a signal that detected a placement of an item 210-5 in a region within the cart during the time of interest 250. The placement of the item 210-5 signifies a likelihood that the item 210-5 is not involved in a suspicious transaction.

At step 1360, upon receipt of the signal, the Cart Inspector 150 classifies the item as an observable item 150-5-4.

To process an occurrence of a fourth false positive condition, at step 1370, the Cart Inspector 150 classifies the item 210-4 in the cart as a bulk item 150-5-3 upon detecting information in the transaction data 160 that is related to a predefined bulk item. In another embodiment, the Cart Inspector 150 obtains video data associated with a time of interest 250. The video data originates a video camera(s) 220 that monitors a transaction area 200. For example, the video camera(s) 220 can be elevated over a horizontal plane where the transaction occurs in the transaction area 220, such that the video camera(s) 220 record transactions in the transaction area 220 for a vantage point above the transaction area 200.

FIG. 13 is an example flowchart 1400 of processing steps performed by the Cart Inspector 150 to create a minimum suspicion level that represents a least suspicious state of the transaction according to embodiments herein.

At step 1410, the Cart Inspector 150 obtains video data from a video camera(s) 220 that monitors a transaction area 200.

At step 1420, the Cart Inspector 150 analyzes a plurality of target images in the video data associated with a transaction in the transaction area 200. Thus, the Cart Inspector 150 analyzes each video frame created by the camera 200 during the transaction.

At step 1430, based on analysis of each of the plurality of target images, the Cart Inspector 150 identifies a portion of the plurality of target images that represent a least suspicious state of the transaction.

At step 1440, the Cart Inspector 150 identifies at least one least-suspicious image that represents a time of interest during the transaction that a cart 210 is least likely to contain unpurchased merchandise items.

At step 1440, the Cart Inspector 150 creates a minimum suspicion level that represents the least suspicious state of the transaction.

For example, the Cart Inspector 150 performs the video analysis as discussed throughout this document upon each video frame created for the transaction. By doing so, a suspicion level is created for each video frame of the transaction. Hence, one of the video frames will have a lowest suspicion level as compared to the other video frames of the transaction. The Cart Inspector 150 identifies the video frame with the lowest suspicion level as a least-suspicious image of that transaction because the "lowest suspicion level" assigned to that video frame represents a point in time (or a location in the transaction area) where the transaction was at its least suspicious state.

Note again that techniques herein are well suited for a Cart Inspector 150 that performs video analysis 150-1 of target images 170-1, 170-2, 170-3, 170-5, 170-6 that portray a transaction near a point of sale terminal 230. Based on the video analysis 150-1, a suspicion level 300, 400, 500, 600, 700 for the transaction is created when the target image 170-1, 170-2, 170-3, 170-5, 170-6 portrays an item(s) 210-2, 210-3, 210-4, 210-5, 210-6 transported through a transaction area 200 at a particular time 250 during the transaction.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the Internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a processor", or "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method comprising:
    obtaining video data associated with at least one time of interest, the video data originating from at least one video camera that monitors a transaction area;
    analyzing the video data with respect to at least one target image associated with a transaction in the transaction area during the at least one time of interest, the at least one target image provided in the obtained video data; and
    creating an indication of a suspicion level for the transaction based on analysis of the at least one target image.

2. The method as in claim 1, wherein obtaining video data associated with the at least one time of interest includes:
    identifying a time stamp in transaction data of the transaction;
    defining the at least one time of interest as contemporaneous with the time stamp; and
    identifying the at least one target image as included in at least one portion of the video data created during the at least one time of interest.

3. The method as in claim 2, wherein identifying the time stamp includes:
    identifying a last time stamp in the transaction data.

4. The method as in claim 1, wherein obtaining video data associated with the at least one time of interest includes:
    defining at least one critical location in the transaction area;
    defining the at least one time of interest as when a cart is the critical location in the transaction area, the cart comprising a device for transporting items through a retail environment; and
    identifying the at least one target image as included in at least one portion of the video data created during the at least one time of interest, the at least one target image thereby portraying activity occurring at the critical location during the at least one time of interest.

5. The method as in claim 4, wherein defining the critical location in the transaction area includes:
    defining the critical location as a location in the transaction area suited for differentiating between suspicious activity and non-suspicious activity.

6. The method as in claim 4, wherein defining the critical location in the transaction area includes:
    defining the critical location as a location where the cart is in the transaction area and most likely to be empty when it is involved in a non-suspicious transaction.

7. The method as in claim 1, wherein analyzing the video data with respect to at least one target image associated with a transaction includes:
    performing a comparison of the at least one target image with at least one reference representation to determine the extent that the at least one target image portrays one of imagery of non-suspicious activity and imagery of suspicious activity.

8. The method as in claim 7, wherein performing the comparison of the at least one target image with the at least one reference representation includes:
    defining the at least one reference representation as a template depicting a non-suspicious transaction.

9. The method as in claim 7, wherein performing the comparison of the at least one target image with the at least one reference representation includes:
    comparing at least one target image depicting a cart proximate to a point of sale location in the transaction area with the at least one reference representation, the at least one reference representation comprising a template of an empty cart, the cart suitable for transporting items through the transaction area.

10. The method as in claim 7, wherein creating the indication of the suspicion level for the transaction based on analysis of the at least one target image includes:
    if the comparison results in detection of a similarity between the at least one target image and the at least one reference representation, setting the indication of the suspicion level to a lowest suspicion level.

11. The method as in claim 7, wherein creating the indication of the suspicion level for the transaction based on analysis of the at least one target image includes:
    if the comparison results in detection of a difference between the at least one target image and the at least one reference representation, for each portion of the at least one target image that portrays at least one item transported through the transaction area:
    adjusting the suspicion level of the transaction based on at least one of
        (i) a location of the at least one item in the cart;
        (ii) a size of the at least one item;
        (iii) a shape of the at least one item;
        (iv) a color of the at least one item;
        (v) a characteristic of the at least one item;
        (vi) a probability that the item qualifies for a false positive classification.

12. The method as in claim 11, wherein adjusting the suspicion level of the transaction based on the location of the at least one item in the cart includes one of:
    minimally increasing the suspicion level when the portion of the at least one target image portrays at least one item in an upper compartment of the cart;
    moderately increasing the suspicion level when the portion of the at least one target image portrays at least one item in a basket of the cart; and
    substantially increasing the suspicion level when the portion of the at least one target image portrays at least one item in beneath the a basket of the cart.

13. The method as in claim 11, wherein adjusting the suspicion level of the transaction based on the probability of the item qualifying for the false positive classification includes:
    detecting an indication of movement over time in the portion of the at least one target image that portrays the item transported through the transaction area; and
    upon detecting the indication of movement, creating an indication that the item transported through the transaction area is likely a moving item.

14. The method as in claim 11, wherein adjusting the suspicion level of the transaction based on the probability of the item qualifying for the false positive classification includes:
    detecting a distribution of a color in the portion of the at least one target image that portrays the item transported through the transaction area, the color corresponding to a shopping bag used in the transaction area; and
    upon detecting the distribution of the color, creating an indication that the item transported through the transaction area is likely a bagged item.

15. The method as in claim 11, wherein adjusting the suspicion level of the transaction based on the probability of the item qualifying for the false positive classification includes:
  searching for an occurrence of at least one predefined bulk item the transaction data for information related to the identification of the at least one predefined bulk item; and
  upon detecting information in the transaction data that is related to the at least one predefined bulk item, creating an indication that the at least one item transported through the transaction area is likely a bulk item.

16. The method as in claim 1, wherein analyzing the video data with respect to at least one target image associated with a transaction includes:
  identifying a segment of the video data that portrays at least one image of a cart, a portion of the at least one image of the cart portraying an item transported by the cart;
  obtaining a visual representation for each item listed in transaction data;
  comparing the portion of the at least one image of the cart portraying an item transported by the cart with the visual representation for each item listed in transaction data;
wherein creating an indication of a suspicion level includes:
  increasing the suspicion level if the portion of the at least one image of the cart portraying an item transported by the cart fails to correlate with any visual representation for each item listed in transaction data; and
  decreasing the suspicion level if the portion of the at least one image of the cart portraying an item transported by the cart correlates with at least one of the visual representation for each item listed in transaction data.

17. The method as in claim 1, further comprising:
  performing the step of obtaining the video data associated with a second time of interest and performing the step of analyzing the video data with respect to at least one second target image associated with a second transaction;
  performing the step of creating the indication of a suspicion level to create a second indication level for the second transaction based on analysis of the at least one second target image;
  creating a ranking of the at least one target image and the at least one second target image according to suspicion level.

18. The method as in claim 1, further comprising:
  defining a threshold suspicion level;
  comparing the indication of the suspicion level for the transaction based on analysis of the at least one target image with the threshold suspicion level;
  upon detecting the indication of the suspicion level surpasses the threshold suspicion level, creating a notification associated with the transaction.

19. The method as in claim 18, wherein creating the notification associated with the transaction includes:
  creating a real-time notification contemporaneously with the transaction as the transaction occurs in at least one of a self-checkout transaction area and an assisted checkout transaction area.

20. The method as in claim 1, wherein obtaining video data associated with the at least one time of interest, the video data originating from the at least one video camera that monitors a transaction area includes:
  obtaining video data originating from at least one video camera elevated to a position situated over a horizontal plane where the transaction occurs in the transaction area, the at least one video camera thereby creating video data that represents at least one of:
  (i) an overhead view of a cart transporting at least one item through the transaction area; and
  (ii) an elevated perspective view of the cart transporting at least one item through the transaction area.

21. A computer system comprising:
  a processor;
  a memory unit that stores instructions associated with an application executed by the processor; and
  an interconnect coupling the processor and the memory unit, enabling the computer system to execute the application and perform operations of:
    obtaining video data associated with at least one time of interest, the video data originating from at least one video camera that monitors a transaction area;
    analyzing the video data with respect to at least one target image associated with a transaction in the transaction area during the at least one time of interest, the at least one target image provided in the obtained video data; and
    creating an indication of a suspicion level for the transaction based on analysis of the at least one target image.

22. A method comprising:
  obtaining video data from at least one video camera that monitors a transaction area;
  analyzing a plurality of target images in the video data, the plurality of target images associated with a transaction in the transaction area;
  based on analysis of each of the plurality of target images, identifying a portion of the plurality of target images that represent a least suspicious state of the transaction;
  creating a minimum suspicion level that represents the least suspicious state of the transaction.

23. The method as in claim 22, wherein identifying the portion of the plurality of target images that represent the least suspicious state of the transaction, includes:
  identifying at least one least-suspicious image, the at least one least-suspicious image representing at least one time of interest during the transaction that a cart is least likely to contain unpurchased merchandise items.

* * * * *